United States Patent
Crausaz (10) Patent No.: US 10,362,121 B1
(45) Date of Patent: Jul. 23, 2019

(54) COMMUNICATIONS PATH VERIFICATION

(71) Applicant: SHORETEL, INC., Sunnyvale, CA (US)

(72) Inventor: Pascal R. Crausaz, San Jose, CA (US)

(73) Assignee: Mitel Networks, Inc. DE (US)

( * ) Notice: Subject to any disclaimer, the term of this patent is extended or adjusted under 35 U.S.C. 154(b) by 188 days.

(21) Appl. No.: 14/328,281

(22) Filed: Jul. 10, 2014

(51) Int. Cl.
*G06F 15/16* (2006.01)
*H04L 29/08* (2006.01)
*H04L 12/26* (2006.01)

(52) U.S. Cl.
CPC ............ *H04L 67/141* (2013.01); *H04L 43/08* (2013.01)

(58) Field of Classification Search
CPC .................................................. H04L 12/5815
USPC .................................................. 709/206, 227
See application file for complete search history.

(56) References Cited

U.S. PATENT DOCUMENTS

| | | | |
|---|---|---|---|
| 5,555,289 A | 9/1996 | Hashimoto | |
| 5,928,325 A * | 7/1999 | Shaughnessy | G06Q 10/107 709/206 |
| 7,035,923 B1 * | 4/2006 | Yoakum | H04L 67/24 379/106.01 |
| 7,587,040 B2 | 9/2009 | Noble, Jr. | |
| 7,725,548 B2 * | 5/2010 | Ohtani | H04L 65/403 370/230 |
| 7,778,191 B2 | 8/2010 | Sun | |
| 8,208,411 B2 | 6/2012 | Kakiuchi | |
| 8,644,836 B2 | 2/2014 | Ridley et al. | |
| 2004/0158609 A1 * | 8/2004 | Daniell | H04L 12/581 709/206 |
| 2005/0138128 A1 * | 6/2005 | Baniel | H04L 12/581 709/206 |
| 2009/0182565 A1 * | 7/2009 | Erickson | G06Q 10/06 705/300 |
| 2010/0149996 A1 | 6/2010 | Sun | |
| 2010/0208634 A1 * | 8/2010 | Eng | H04L 45/00 370/310 |
| 2012/0158859 A1 * | 6/2012 | Saxena | H04L 51/30 709/206 |
| 2012/0158943 A1 * | 6/2012 | Esteve Balducci | H04L 12/5815 709/224 |
| 2013/0091205 A1 * | 4/2013 | Kotler | H04L 65/4015 709/204 |
| 2015/0032809 A1 * | 1/2015 | Xie | H04L 65/1083 709/204 |
| 2015/0149643 A1 * | 5/2015 | Hu | H04L 41/0893 709/227 |

FOREIGN PATENT DOCUMENTS

EP 1 468 663 A1 10/2004

* cited by examiner

*Primary Examiner* — Hieu T Hoang (57) ABSTRACT

A method can include storing, in memory, resource operating data associated with at least one endpoint resource that is registered for operation in a communications network for a given user. The resource operating data can be analyzed in response to establishing a communications session over a communications path between an endpoint resource associated with the given user and at least one other communications resource. The method can include verifying the communications path for the established communications session based on the analyzing.

23 Claims, 3 Drawing Sheets

COMMUNICATIONS PATH VERIFICATION

TECHNICAL FIELD

This disclosure relates to verifying a communications path for a communications session.

BACKGROUND

A communications system can connect one or more resources (e.g., hardware devices and/or software applications) together in a communications session. In some circumstances, a given user may utilize multiple communications resources, which can be located in one or more locations and/or may also be mobile. The communications system can be configured to select which of the communications resources to use in establishing the communications session. The resource selection can be implemented for inbound or outbound communications.

SUMMARY

This disclosure relates to verifying a communications path for a communications session.

In one example, a method can include storing, in memory, resource operating data associated with at least one endpoint resource that is registered for operation in a communications network for a given user. The resource operating data can be analyzed in response to establishing a communications session over a communications path between an endpoint resource associated with the given user and at least one other communications resource. The method can include verifying the communications path for the established communications session based on the analyzing. The method can be implemented, for example, as instructions stored in one or more non-transitory computer readable media that are executable by one or more processing unit.

In another example, a system can include one or more memory devices configured to store resource operating data and instructions, the resource operating data providing an indication of at least one of use or non-use of a plurality of resources registered for operating in a communications network. One or more processors can be configured to access the memory and to execute the instructions. The instructions can include an analyzer and a verification method. The analyzer can be programmed to analyze resource operating data in response to establishing a communications session over a communications path between an endpoint resource associated with a given user and at least one other communications resource. The analyzer can provide analysis data indicating the at least one of use or non-use of a subset of the resources associated with the given user. The verification method can be programmed to provide verification data indicative of whether the endpoint resource in the communications path for the established communications session is being utilized to provide interactive communications via the established communications session.

DETAILED DESCRIPTION

This disclosure relates to verifying a communications path for a communications session.

For example, one or more resources (e.g., hardware and/or software resources) can be registered for operation in a communications network. Operating data for one or more resources associated with respective users can be monitored and stored in memory. As an example, the operating data can include information that indicates, directly or indirectly, about the use or non-use of communications resources (e.g., activating buttons or keystrokes, audio data, image data, detecting uni- or bi-directional communications, detecting and/or analysis of media traffic or the like). A communications session can be established to provide a path between an endpoint resource, which is associated with a given user, and another communications resource. As used herein, a communications resource can refer to hardware and/or software such as including an endpoint resource, a server device, a concentrator or anything that handle either signaling or communications of media traffic in any known or yet to be developed manner. The session can be initiated as an inbound or outbound communication for the given user. Once the communications session has been established between a given user's endpoint resource and another resource (e.g., within the same or a different network from the user's endpoint resource), the endpoint operating data can be analyzed to ascertain activity (e.g., user interaction, presence and/or traffic flow) or inactivity for one or more resources associated with the given user. The analysis thus can be employed to verify the communications path that has been established for the communications session. In this way, the verification can determine if the intent of providing interactive communications between the given user and the other resource(s) is reflected properly by the communications path for the session. Early positive confirmation can be employed to help ensure that the correct resources are in fact being utilized in a given session. Since the verification is implemented after or during the communications session has already been established, the verification can be considered retrospective verification of the communications path. Such retroactive verification can detect circumstances when an endpoint resource has been connected erroneously in the communications path of the communications session.

As a further example, if the verification results are negative, systems and methods disclosed herein can cause (e.g., initiate) corrective action. Such corrective action can include sending a notification to inform the given user that an incorrect endpoint resource has been connected in a communications session. This can enable the given user to re-initiate the communications session from the same or a different endpoint resource. In other examples, the corrective action can automatically redirect an endpoint of the established communications session to a different endpoint resource associated with the given user. As yet another example, the corrective action can establish another communications session via a different mode of communications (e.g., a telephone session can be changed to an instant messaging session). The type of corrective action can vary and be selected according to the type of endpoint resources available to provide interactive communications for the given user.

As used herein, interactive communications refers to one or more types of communications in which user interactions with an endpoint resource (e.g., voice audio, captured user images and/or other user inputs) are communicated from the endpoint resource via the communications path. The interactive communications can include unidirectional or bidirectional communications from the user's endpoint resource and further can include signaling and/or media traffic. Additionally, in some examples, more than one endpoint resources can be utilized to provide the interactive multimedia communications for a given session involving a given user (e.g., different resources used for voice traffic, data communications and/or video communications).

Figure 1:
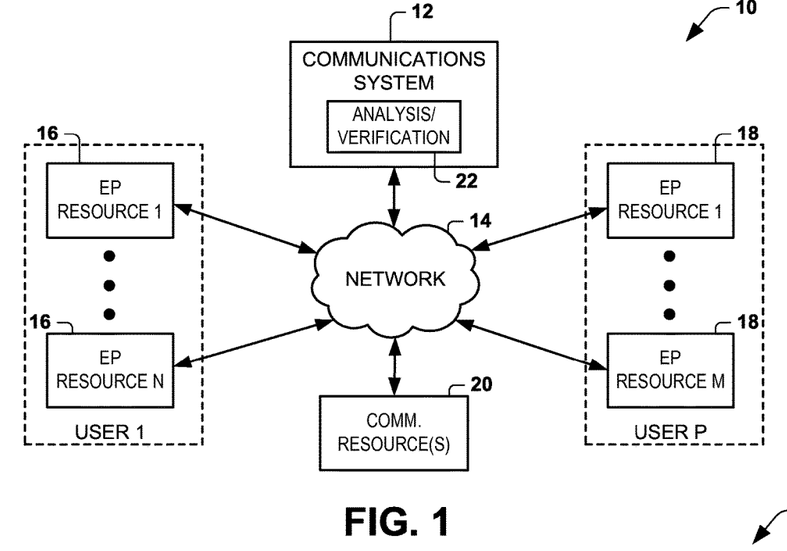
FIG. 1 depicts an example of a communication system configured to verify a communications path.

FIG. 1 depicts an example of a system 10. The system 10 includes a communications system 12 that can communicate with a network 14. The network 14 can include one or more networks capable of transferring data. For example, the network 14 can include a local area network (LAN) and/or a wide area network (WAN) (e.g., the Internet, cellular telephone network(s),) and can be implemented as including a wired network (electrically conductive cables, optical fibers etc.) and/or a wireless network (e.g., wireless LAN, WiMax etc.). A plurality of endpoint resources 16 and 18 can be registered for operation within the communications system 12. Additionally or alternatively, usage of one or more such resources 16 and 18 can be detectable by the communications system 12.

In some examples, the communications system 12 can define a private enterprise communications network that can operate within the network 14. As used herein, a private communications network refers to a communications network, corresponding to an enterprise that is administered and/or operated by or on behalf of a private entity (e.g., a company, group of users, or other service provider). The private network can be implemented locally at a single site. In other examples, the private network can be a logical construct that is distributed across multiple sites but logically operated as a single enterprise, such as an enterprise unified communication system. In other examples, the communications system 12 can be a service provider's public network (e.g., Verizon, AT&T or T-Mobile or other common carrier), which can provide cellular wireless communications and/or switched telephone services over physical connections.

In examples where the communications system 12 is a private enterprise network, the system can be configured (e.g., include a private branch exchange (PBX)) to perform call control and routing functions for client devices operating in the private network. This is in contrast to a common carrier (e.g., telephone service provider) that operates for many businesses or for the general public, such as a mobile wireless network. The enterprise system thus can include a hardware resources (e.g., switches, logic lines, routers, conferencing systems, and other controls) and software configured to couple to a public switched telephone network (PSTN) or another network, such as the Internet, which are demonstrated schematically as part of the network 14 in the example of FIG. 1. The enterprise system thus can send and receive communications to and from endpoint resources, those resources registered in the private network, as well as control routing, distributing and managing communications within the private network. The enterprise system can be configured to implement packet switched calls, such as implementing voice over internet protocol (VoIP), circuit switched calls or a combination of packet and circuit switched communications.

The communications system 12 can implement the communications network for a plurality of communications resources, including the endpoint resources, demonstrated as 16 and 18. A plurality of users, demonstrated as user 1 through user P, can utilize one or more endpoint resources 16 and 18, which can be registered and authenticated for operation in the communications system 12 (where P is a positive integer). In some examples herein, endpoint resources 16 and 18 can provide for interactive forms of communications, such as audio communications (telephone calls, voice mail), audio and video communications (e.g., video conferencing, video voice mail) and/or data communications (short message service, instant message, data collaboration). Thus, the endpoint resources 16 and 18 can be implemented as a variety of different types of hardware and/or software, such as IP phones, desk phones, soft phones, video phones, smart phones, cellular telephones, voice conferencing devices, computers, internet appliances, as well as combinations and parts thereof.

One or more other communications resources 20 can also be configured to communicate via the network 14. The other resources 20, for example, represent other endpoint resources that can be configured to operate external to the communications system 12 (e.g., they are not currently registered and authenticated to operate in the communications system). The other resources 20 can be implemented as the same types of hardware and/or software as the endpoint resources 16 and 18 and, in some examples, can be used by user 1 through user P.

In the example illustrated in FIG. 1, endpoint resources 16, demonstrated as resources 1 through N, are associated with a given user, indicated at user 1, and resources 18, demonstrated as resources 1 through M, are associated another user, indicated at user P, where each of M, N and P are positive integers. As mentioned, in some examples, some, all or none of the resources 16 and 18 may be registered for operation within the communications system 12. Each of the endpoint resources registered and authenticated for operation in the communications system 12 thus can enable the communications system to perform call control and routing functions with respect to such resources. Some endpoint resources 16 or 18 (e.g., desk phones, cell phones, smart phones) can be assigned for primary (e.g., default) use for a given user, but may in some circumstances be utilized different users. Other endpoint resources (e.g., video conferencing systems) can primarily be shared resources.

The communications system 12 can include an analysis/verification process 22 to verify a communications path involving one or more endpoint resources 16 and 18 in an established communications session. As mentioned, the communications system 12 can monitor endpoint operating data of the endpoint resources registered for operation in an enterprise network for a given user. The operating data can represent operation of the endpoint resources 16 and 18 as a whole, such as status and user information. In other examples, the operating data for a resource can include data collected from a part of a respective resource, such as keystroke data from a keyboard or keypad, audio data from a microphone, image data from a camera. The operating data can represent the state of resource (e.g., a binary indication of activity), such as generally indicating use or non-use for a keyboard, microphone sensing audio, does the camera capture images). In other examples, the operating data can include the collected data, such as corresponding to audio from a microphone (e.g., from a voice channel) and/or images from a camera (e.g., from a video channel).

The analysis/verification process 22 can be configured to analyze the endpoint operating data for a respective endpoint resource 16 or 18 for an established communications session involving such endpoint resource. For instance, the session can be an interactive communications session between enterprise endpoint resources 16 and 18 or it can be between an enterprise endpoint resource 16 or 18 and another communications resource 20 that is not registered for operation in the enterprise network for the session. The analysis/verification process 22 can employ the analysis to verify one or more call legs in the communications path for the established communication. For example, the analysis/verification process 22 can be configured to determine whether the communications path is valid or invalid based on the endpoint operating data. If the endpoint operating data monitored for a given user activity is consistent with the communications session, the communications path can be determined as valid. For the example of a communications path that includes EP resource 1 (user 1), if the analysis indicates that the EP resource 1 is in fact being used for an established communications session, the communications path for such session can be considered valid. The endpoint operating data that is analyzed can provide a direct indication of use of a given endpoint resource during the session. Examples of direct operating data to indicate use of a given endpoint can include detecting keystroke data, voice audio activity or video image activity from the given resource. Alternatively or additionally, the endpoint operating data can provide an indirect indication of use or non-use for a given endpoint resource. Some example of indirect operating data include detection of keystroke from a computer that is located adjacent a user's desk phone, the location of a user's mobile telephone to provide an indication of a location for the user, use of a resource within a predetermined time before establishing the session, detecting a image of a person from a local camera at or near the location of the endpoint. In some examples, direct or indirect operating data can be further analyzed to ascertain that a specific individual is using a given resource (e.g., identifying a voice of a user and matching it with a pre-computed voice signature or matching skin tones or facial profiles for uses).

As mentioned, the analysis/verification process 22 can verify one or more established call legs for a given communications session. As an example, assume that a user initiates a call to another party from an application running on a computer (e.g., a laptop) and that the communications system 12 is configured to employ a user's home phone as a designated endpoint for calls initiated via the application. In this scenario, the communications system 12 would first call the designated resource (e.g., the user's home phone) and then once the user has answered the call, the analysis/verification process 22 can verify the call path established between the enterprise and the designated resource. If the analysis/verification process 22 verifies the call path, the communications system 12 can call the third party via another call leg and then join the call leg established to the third party to the call leg to user's designated resource in order to complete the call session. If the analysis/verification process 22 is unable to verify the established call leg between the enterprise and the designated device, the system can implement corrective action, such as disclosed herein.

As a further example, the analysis/verification process 22 can aggregate the endpoint operating data for a plurality of endpoint resources associated with the given user, such that aggregated endpoint operating data can be evaluated heuristically to verify whether or not the communications path is correct. Since an exact solution may be difficult to compute in each situation, the analysis/verification process 22 can employ heuristics to verify the communications path based on the aggregate endpoint operating data for a given user. As an example, assuming that a communications session has been connected at EP resource 2 for a given user, where the analysis/verification process 22 analyzes the EP operating data to determine (1) current inactivity at EP resources 1 and 2 assigned to the given user and (2) recent prior activity (e.g., within 10 minutes) at the EP resource 2 for the given user, can provide a strong indication to infer activity at such EP resource 2 sufficient to confirm that the communications path is correct.

In some examples, the analysis/verification process 22 can determine that the communications path for an established session is likely invalid. As an example, the analysis/verification process 22 can determine that a communications path may be invalid if the endpoint operating data for the endpoint resource associated with the given user indicates at least one of activity or inactivity inconsistent with the established communications session. The analysis/verification process 22 can make such determination based on evaluating the endpoint operating data for the endpoint resource connected in the communications session and/or based on evaluating endpoint operating data for one or more other endpoint resources that are not involved in the communications session. As an example, assume that EP resource 2 for the given user has been connected in a communications session. If the analysis/verification process 22 analyzes the EP operating data to determine (1) no voice activity at EP resource 2, (2) current voice activity at EP resource 1 assigned to the given user and (2) recent prior activity (e.g., within 10 minutes) at the EP resource 1 for the given user, the verification process can infer that the established communications path is invalid. In this example, the endpoint operating data for EP resource 1, which is different from the endpoint resource 2 that is connected in the established communications session, indicates activity inconsistent with the communications session. The analysis/verification process 22 can also employ heuristics to evaluate operating data for one or more resource to determine a communications path is invalid. For example, if a user repeats the same outbound call from a given endpoint resource to the same number a certain number of times within a prescribed time window, the analysis/verification process 22 can infer something associated with the communications path may be erroneous.

In some examples, in response to determining the likelihood that the communications path is invalid, the analysis/verification process 22 can be configured to initiate one or more forms of corrective action. For example, analysis/verification process 22 can notify the given user that the communications path has been determined to be incorrect, such as by sending (or causing to be sent) a notification to the given user (e.g., via SMS or other messaging service). Additionally or alternatively, in response to determining that the communications path is invalid, analysis/verification process 22 can take corrective action by causing the communications session for the given user to be redirected to another endpoint resource associated with the given user, which has been determined to be more appropriate for the session. The endpoint resources to which the path is redirected can be determined based on the analysis automatically or in response to a user input, for example.

It is common for users to utilize mobile devices, such as tablet computers, laptops and cellular telephones (e.g., smart phones), which are registered as endpoint resources for operation in the communications system 12 (e.g., a private enterprise network). Mobile devices operating as endpoint resources thus have a variable location that can be determined and stored as location data as part of the endpoint operating parameter data. As disclosed herein, the location data can depend on the type and capabilities of the mobile device. For example, the location data can include data derived from a cellular network, global positioning system, IP address of the mobile device, near field communications between the mobile device and another resource, WiFi network access or the like. The analysis/verification process 22 thus can verify the communications path based on the location data for one or more mobile endpoint resources associated with the given user. For instance, where the mobile device is different from the endpoint resource in an established communications session, the location data be utilized to ascertain proximity of the mobile endpoint resource relative to the endpoint resource connected in the session.

As yet another example, in addition to verifying that an appropriate endpoint resource is connected in a communications path for a respective communications session, the analysis/verification process 22 can also be configured to verify the identity of the given user based on the operating data. For example, the operating data can include voice audio data and/or image data obtained during the established session. For example, the voice audio data can be acquired via a microphone of the endpoint resource 16 or 18 or a microphone that is external to the resource. Similarly, the image data can be acquired from a camera that is on the resource or another resource that is registered and being monitored by the communications system. The analysis/verification process 22 can verify an identity of the given user in the established communications session based on the at least one of voice audio data and the image data for the given user. For instance the acquired audio data can be analyzed to construct a voice signature that can be compared to a stored voice signature data for the given user. The image data can be used to detect skin tones and/or facial recognition, which can be compared to corresponding stored image data for the given user to determine whether or not the given user is using the endpoint resource that is connected in the established session.

Figure 2:
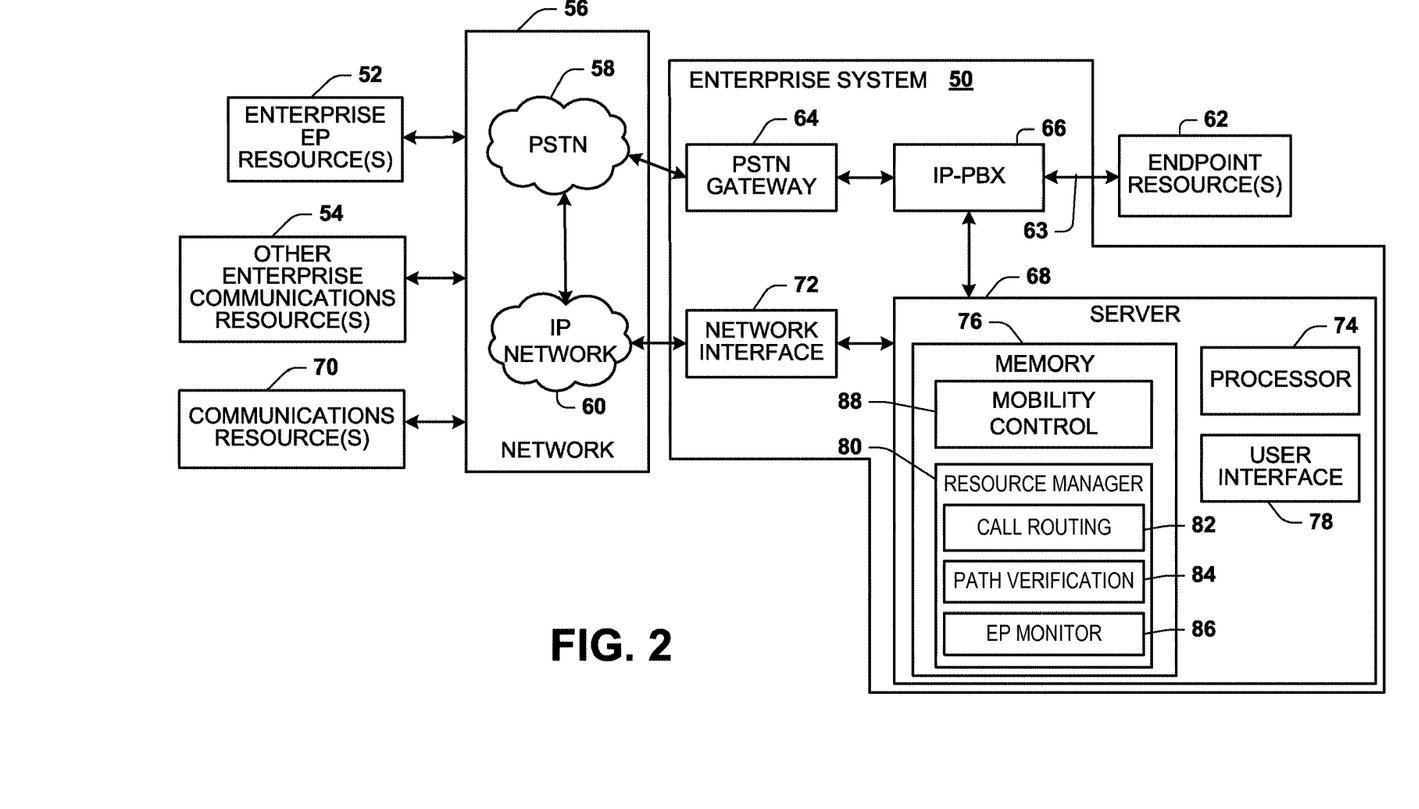
FIG. 2 depicts another example of a communication system configured to verify a communications path.

FIG. 2 depicts an example of an enterprise communications system 50 (e.g., corresponding to an example embodiment for communications system 12 of FIG. 1), which is configured to verify communications path for an established communications session. In the example of FIG. 2, the enterprise system 50 can correspond to a private enterprise network that is located and/or operates outside the control of a public service provider network (e.g., a common carrier network); although it may utilize resources of the public service provider network. The enterprise system 50 can include a private network (e.g., for an organization or business entity), a managed network (e.g., by a VoIP service provider, such as Vonage or the like) or a personal network (e.g., a home-based network). Any number of endpoint resources 52 are registered and authenticated to enable enterprise call control, call routing functionality as well as use of other enterprise communications resources 54 (e.g., voicemail system, conference bridges, etc.) available via the enterprise system 50.

The enterprise system 50 can communicate with its registered communications resources 52 and 54 via one or more networks network 56, schematically indicated as including a PSTN 58 and an IP network 60. Some endpoint resources 62 that are registered for operation with the enterprise system 50 can reside behind a firewall and communicate within the private network over a secure LAN, schematically indicated at 63, via an appropriate protocol (e.g., and IP protocol). It is understood that the LAN 63 could be part of the network 56. For example, the other resource(s) 62 may include one or more of a voice over IP (VoIP) telephony device (e.g., an IP telephone, IP fax machine, multi-media computer, media terminal adapter, analog terminal adapter, or other device or service) that is capable of communicating with the IP PBX 66 using an IP protocol.

In the example of FIG. 2, the enterprise system 50 includes a PSTN gateway 64 that is in communication with the PSTN 58, such as through a corresponding interface implemented by the gateway. For example, the gateway 64 can be in the form of a local loop that includes a plurality of telephone lines or an ISDN service, such as PRI/BRI, for providing a link between the enterprise and the PSTN gateway 64 for placing and receiving calls over the PSTN 58. It is to be understood that the network 58 can represent the PSTN as well as one or more public land mobile network (PLMN) that are in communication with the PSTN.

An IP-PBX 66 is connected with the PSTN gateway 64 and one or more servers 68. The IP PBX 66 can be programmed to performing switching functions, such as establishing, maintaining, modifying and disconnecting connections with endpoint resources at legs of a communications session. The PBX 66 can connect with another node in the enterprise (e.g., the PSTN gateway 64), the server 68 or one or more other enterprise resources 54 or 62 using an IP protocol, for example. While the PSTN gateway 64 is illustrated within the enterprise system 50, it will be understood that the PSTN gateway may partially or completely reside external to the enterprise system.

Examples of signaling communications protocols that can be utilized for establishing a communications session through the PBX 66 can include H.323 or session initiation protocol (SIP), which are standard VoIP signaling protocols. Using SIP, for instance, the enterprise endpoint resource 52 (or other authenticated resources 54 or 62) could send an IP-based SIP "INVITE" message to the IP PBX 66, to set up call legs and establish an outbound communications session. For example, the IP PBX 66 can process a request and establish communications sessions between an enterprise resource 52, 54 or 62 and another communications resource 70, which may or may not be registered in the enterprise system 50 via the PSTN gateway 64 or via a network interface 72. While the IP-PBX 66 and the PSTN gateway 64 are illustrated separate components, they may be integrated within the enterprise system 50.

Additionally, various CODECs can be used for communicating media during an established communications session. The particular Codec can vary depending on the type or types of media. For example, Codec's can include H.264, VP8 or the like can be used for encoding and decoding video communications traffic and audio Codec's such as G.711, G729, OPUS or the like can be used for encoding and decoding audio communications traffic. The encoding and decoding of communications traffic can further be used (e.g., by the server 68) to analyze the traffic as part of an analysis/verification process 84, as disclosed herein.

In the example of FIG. 2, the server 68 includes a processor 74 that is programmed and configured to control operation of the server based upon executable instructions stored in associated memory 76. The memory 76 can include random access memory (RAM), read only memory (ROM), flash memory, or any other type or a combination of memory devices. The processor 74 can communicate through the IP PBX via signaling using a control protocol (e.g. SIP, SCCP or H.323). The processor 74 can also retrieve and store data and instructions to and from the memory 76. Alternatively or additionally, the processor 74 may include cache or access other associated memory (not shown) directly for performing the functions described herein as well as for performing and controlling other functionality. The server 68 can also include a user interface component 78 that can be utilized to program a resource manager 80 and mobility control 88, such as by an administrator or other authorized user. The memory 76 can also store other instructions and code elements executable by the processor 74 to implement other functions and services provided by the enterprise system.

The resource manager 80 can be programmed to control and verify communications paths communications sessions established for each enterprise endpoint resource. In the example of FIG. 2, the resource manager 80 includes a call routing and control method 82, an analysis/verification method 84 and an endpoint monitor method 86. The resource manager 80 can establish and verify communications sessions as part of protocols and services implemented, for example, at the application layer, at the session layer (e.g., using SIP) and/or at the transport layer (e.g., TCP connections) in the OSI model. The call routing method 82 can be programmed to establish communications sessions for enterprise endpoint resources 52, 54 and 62 in communications sessions. For example, call routing method 82 can employ SIP or another signaling communications protocol to provide communications parameters for creating, modifying and terminating a given communications session. Once established, interactive communications can occur for the enterprise endpoint resource and one or more other communications resources, which can reside in the enterprise or be external to the enterprise.

The endpoint monitor 86 can be programmed to acquire endpoint operating data from endpoints to enable analysis thereof by the analysis/verification method 84 after the session has been established, as disclosed herein. The endpoint monitor 86 can receive and store in the memory (e.g., in a database) 76 operating data from the enterprise resources 52, 54 and 62. The operating data can represent activity or inactivity for each enterprise resources registered for each of a plurality of users. For example, the endpoint operating data can include activity data, location data and/or session data for each respective endpoint resource.

The activity data can include any information that can indicate use or non-use of a given endpoint resource or activity of a given user. Examples of activity data thus can include presence state information for an endpoint resource, presence information for a given user (e.g., indicating whether a user is physically present), and/or communications status information. The location data can include latitude and longitude, elevation, or that the endpoint resource is located within a predetermined geographical region (e.g., a room, a campus, a road, a building, an office, a conference room, etc.). The session data further can include information representing the session state for a given endpoint resource (e.g., connected or not connected) as well as interactive information (e.g., audio data from a microphone and/or image data from a camera) associated with the given user for the established communications session. The endpoint monitor 86 can be programmed to obtain the endpoint operating data directly from enterprise resources or it can employ an application programming interface to obtain the operating data indirectly from one or more other applications or services implemented by the enterprise system, for example.

Additionally or alternatively, the activity data 110 can include mode (e.g., presence) data obtained from one or more endpoint resources. For example, a state or mode of an enterprise endpoint resource can be set to include one or more of the following: at work, in the office, out of the office, in a conference, at court, at home, on vacation, unavailable, in the library, in a boardroom, at lunch, on the road, on the phone, on call, off-hook, on-hook, in voicemail, in a meeting, extended leave, custom, standard, offline, online, away, busy, do-not-disturb, or any other appropriate state. Associated with a state there is a default state which can include behaviors for routing, forwarding, finding, voicemail message, etc. The default state associated with can be adjusted or modified based at least in part on a set of rules based on other conditions such as the date (e.g., a holiday, birthday, anniversary, etc.), the time, the day of the week, a previous state, a previous way point, incoming caller's phone number, call handling mode, buddy list, presence state, or any other appropriate other condition. The state of the endpoint resource can also be utilized by call routing functions (e.g., call routing method 82) to route an incoming call to the endpoint resource to establish the communications path for a communications session.

The mobility control application 88 can control mobility functions for mobile endpoint resources 52 that are authenticated and registered for operation with the enterprise system 50. While the example of FIG. 2 demonstrates, the mobility control application 88 residing in memory 76 of the server 68, in other examples, some or all of the mobility control application 88 could be implemented in a computing cloud or be distributed between the enterprise system 50 and a cloud. The mobility control application 88 can be configured to control mobility functions (e.g., call routing and accessing other communications resources 52, 54, 62, 70) for each mobile endpoint resource authenticated for operation with the private network. The mobility control application 88 further can acquire session, activity and/or location information for each mobile endpoint resource, which information can be provided to the endpoint monitor to provide at least a portion of the endpoint operating data for mobile endpoint resources. For example, the mobile endpoint resource can communicate information to the mobility control application 88 (e.g., via a background process over a data network supported by the mobile device) indicative of use and/or location for the mobile device. The endpoint monitor 86 can obtain pertinent information from the mobility control 88 to facilitate the analysis/verification process disclosed herein.

Once a communications session has been established via a call path that includes an enterprise endpoint resource 52, 54 or 62 associated with (e.g., assigned to) a given user, the analysis/verification method 84 can analyze pertinent endpoint operating data to verify the established call path. The pertinent endpoint operating data can be selectively acquired for a subset of operating data related to the endpoint resources involved in the established session and/or based on which given user is associated with the endpoint resource for the established session. The subset of operating data can thus be aggregated and analyzed to ascertain whether or not the communications path seems correct for the established communications session.

Figure 3:
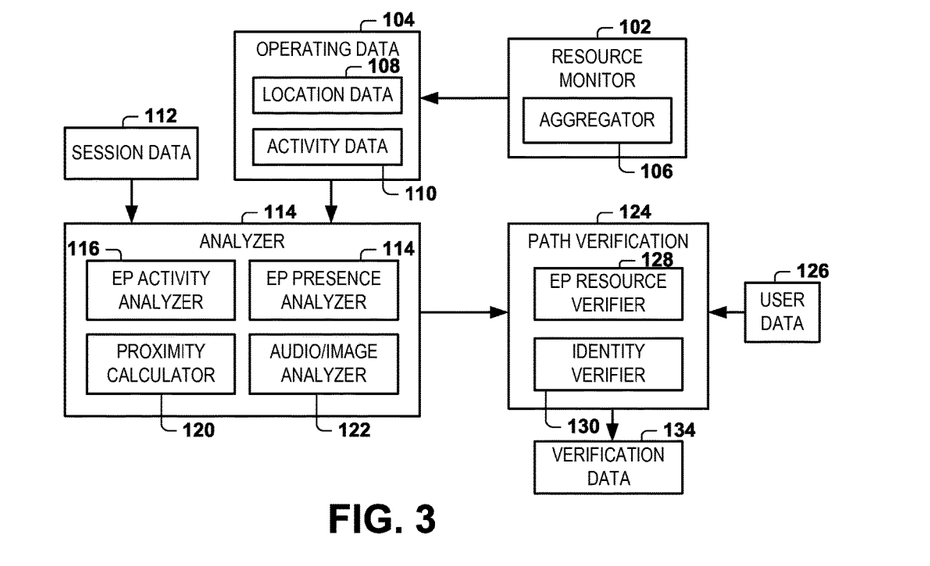
FIG. 3 depicts an example of a verification system that can be implemented to verify and/or validate a resource in a communications path.

FIG. 3 depicts a block diagram of an example analysis and verification system 100, such as can correspond to an example embodiment for the analysis/verification process 22 of FIG. 1 and/or analysis/verification method 84 of FIG. 2. The system 100 can be implemented as instructions and data stored in non-transitory computer-readable medium and are accessed and executed by one or more processing units, which can reside at one or more endpoint resources, at a server or be distributed across endpoint resources and server. As disclosed herein, the system 100 can verify a communications path for an established communications session that involves one or more endpoint resources registered for operating in a private enterprise network. The system 100 thus has access to data associated with operation of endpoint resources that may not be available outside the private enterprise network.

The system 100 includes a resource monitor 102 that is programmed to monitor and collect operating data for a plurality of resources registered and operating in an associated enterprise network. The resource monitor 102 can provide and store operating data 104 in associated memory. The operating data 104 can include location data 108 and activity data 110 associated with each of a plurality of endpoint resources. The location data and activity data can be raw location and activity information such as can be received directly from and end point resource operating in the enterprise.

Alternatively or additionally, location data 108 and activity data 110 can represent an aggregate set of information corresponding to location and activity of each endpoint resource. For example, the aggregator 106 can aggregate location information from a plurality of endpoint resources associated with a given user to provide corresponding location data that indicates a location associated with such given user. Similarly, the aggregator 106 can aggregate data from a plurality of endpoint resources associated with the given user to provide an aggregate indication of activity associated with the given user.

For the example of a cellular telephone (e.g., smart phone), the location data 108 can include one or more cellular network parameter, such as a cellular identifier (cell ID) for cell base station, a location area code (LAC), and a sector ID. The particular scheme or format of such information and how such information is encoded in a cellular network may vary according to the scheme implemented by the carrier to which the cellular interface is designed to operate. For the example of a mobile communications resource that includes a global positioning system (GPS), the location data can correspond to a set or range of GPS coordinates that can be derived from GPS data. For example, the location data 108 for one or more preferred wireless networks can be stored memory according to a known coordinate system, such as latitude and longitude, using the world geodetic system (WGS) 84 geodetic datum, or another local system that may vary from country to country. The location data thus can represent the GPS data and/or cellular network code data. Alternatively, the resource monitor 102 or another function (e.g., that is part of or accessible by analyzer 114) can convert the location data for a respective resource to represent a geographical region (e.g., a room, a campus, a road, a building, an office, a conference room, etc.) where the respective resource is located, such as contextually relevant to the enterprise system.

The system 100 can also receive session data 112, such as by employing an API (not shown) that is programmed to access session data associated with one or more of the respective endpoint resources in the communications system. The session data 112 can include an indication of session state information, such as can be accessed from a presence service implemented in the communications (e.g., communications system 12 of FIG. 1 or enterprise system 50 of FIG. 2). In other examples, the session data 112 can include to content (e.g., data traffic, such as audio and/or video media) that is communicated from or associated with one or more endpoint resources in response to user interaction with such resources. For example, the communication traffic can include audio data (e.g., captured via a microphone), image data (e.g., captured via a camera) or a combination of audio and video data, which can be encoded and decoded according to a codec utilized in the established communications session. While for purposes of explanation the session data 112 is demonstrated as separate from the operating data 104, in other examples, the session data could be obtained by the resource monitor 102 and stored as part of the operating data 104.

The activity data 110 can also include indirect data associated with an activity of a given user that is associated with a set of endpoint resources. For instance, the activity data can include key stroke data associated with a computer keyboard or key pad associated with an endpoint resource. In other examples, the activity data can include image data captured by a camera (e.g., a web camera attached to a computing device such as a smart phone, tablet computer or desktop PC).

An analyzer 114 can employ the session data and associated operating data 104, including the location data 108 and activity data 110, to provide corresponding analysis data for further processing by a corresponding path verification method 124. As mentioned above, the functionality of the analyzer 114 can be implemented at a client device, at a server side device or distributed across hardware and/or software executed at client-side and server-side devices. As disclosed herein, the operating data 104 and session data 112 (e.g., collectively representing resource operating data) can include information sufficient to enable the analyzer 114 and associated path verification method 124 to ascertain whether or not the endpoint resource to which the communications path has been connected for the established communications session is being used for such session. In some examples, the path verification method 124 can, additionally or alternatively, ascertain whether or not a given user to whom the communication was intended is actually interacting with the endpoint resource to which the communications path has been connected for the session.

The analyzer 114 can include one or more methods 116, 118, 120 and 122 programmed to analyze one or more aspects associated with operation of one or more resources associated with a given user based on the operating data 104 and session data 112. The analyzer 114 can be invoked to process the operating data in response to a communications session being established for an endpoint resource registered and operating within the enterprise. The identification of a given enterprise endpoint resource in a communications path of the session can be utilized to selectively access a subset of data 104, 108, 110 and 112 that is determined to be relevant to the analysis and verification process for the identified endpoint resource. For example, the analyzer 114 can be programmed to select the subset of data as including data that can indicate use of endpoint resources that have been registered in the enterprise as being associated with a given user or small group of users (e.g., for shared resources).

As a further example, the analyzer 114 can include an endpoint activity analyzer 116 programmed to compute an indication of activity of one or more endpoints based upon the activity data 110 and/or session data 112 associated with endpoints assigned to a given user. The endpoint activity analyzer 116 can be programmed to determine if a corresponding endpoint resource is experiencing activity during and/or prior to establishing the communications session. The endpoint activity analyzer 116 thus can provide an indication of whether or not a given user's endpoint resource is in use and/or an indication of the extent of use of the endpoint based upon the corresponding activity data 110 and/or the session data 112. If a given endpoint is connected in a corresponding voice communications session, for example, the endpoint activity analyzer 116 can evaluate call connection information provided by the session data 112 to provide analysis data indicating whether or not the connected endpoint resource is experiencing voice activity for a telephone call and, in some examples, an indication of the level of voice activity that is detected as an input the resource. The endpoint analysis data can be employed by the path verification method 124.

The analyzer 114 can also include an endpoint presence analyzer 118 programmed to compute an indication of presence based on the operating data 104 and/or session data 112. For example, the presence analyzer 118 can employ presence state information provided by the session data 112 to determine an indication of a given user's presence with respect to one or more endpoint resources associated with the given user. As further example, if a user's presence state information associated with a desktop phone indicates an out of office state, which can be set in response to a user input, and the endpoint activity analyzer 116 indicates that the communications session has been connected to such desktop phone, the path verification 124 can employ the collective analysis data to determine that the call path is likely infeasible (e.g., invalid) under the circumstances. Thus, as disclosed herein more than one type of analysis data can be combined for verification of a communications path for an established session.

The analyzer 114 can also include a proximity analyzer 120 to compute an indication of proximity of a given user with respect to the endpoint resource that is connected in the established communications session. For example, the proximity analyzer 120 can employ location data 108 associated with a mobile resource to ascertain a relative proximity between the mobile device of a given user and the endpoint resource that is connected in the established communications session. The relative proximity can correspond to a spatial distance and/or a general determination of whether or not the mobile endpoint resource is in a common predefined spatial region with the endpoint resource that is connected in the established session. For example, if the proximity calculator determines that the given users mobile resource resides or was recently detected to reside within a building, room or other predefined region along with the endpoint resources that is connected in the established communications session, the communications path can be determined (by the verification method 124) to correspond to a feasible communications path. However, if the location, based on the location data 108, for the mobile endpoint resource is in a different physical location from the endpoint resource that is connected in the established communications session, the proximity analyzer 120 provide analysis data representing the difference between locations, such that the verification method 124 can determine that the call path corresponds to an infeasible solution since the given user is not in the local proximity of the connected endpoint resource.

The analyzer 114 can also include an audio/image analyzer 122. The audio/image analyzer 122 can be programmed to evaluate audio and/or image data, such as can be provided as part of the session data 112. For example, the audio/image analyzer 122 can analyze audio information in the session data to provide analysis data indicating whether or not voice audio is detected as an input the endpoint resource as part of the audio communications session. Additionally or alternatively, the analyzer 122 can determine whether a video traffic data that is being provided includes a representation of a person (e.g., captured by a camera associated with the connected endpoint resource).

As a further example, the audio/image analyzer 122 can be programmed to determine if a given specific user that is participating in the communications session via the connected endpoint resource is the given user for which the communication was intended. For example, the audio/image analyzer 122 can compute a voice signature based on the audio data that has been captured and decoded as an input audio via a microphone of the endpoint resource, as provided in the session data 112. Additionally or alternatively, the audio/image analyzer 122 can decode an image or recorded video stream and compute a skin tone associated with a detected image or video of a person and/or perform facial recognition with respect to the captured image data to provide a corresponding facial recognition data for such person based on performing facial recognition on image data represented in the session data 112.

The path verification method 124 can employ the resulting analysis data provided by the analyzer 114, including one or a combination of more than one of the endpoint activity analyzer 116, the endpoint presence analyzer 118, the proximity analyzer 120 and/or the audio/image analyzer 122. The path verification method 124 thus can verify whether the communication path for an endpoint resource that is connected in an established communications session is valid or invalid (e.g., respectively corresponding to a feasible solution or an infeasible path). Since path verification operates to confirm whether an already established communications, the verification can correspond to a retroactive verification (in contrast to determining to which endpoint resource the communication is being connected).

The path verification method 124 can include an endpoint resource verifier 128 configured to employ the endpoint analysis data, such as mentioned above, to verify interactive communication via the connected endpoint resource for the established communications session. For example, the endpoint resource verifier 128 can provide verification data 134 indicating whether or not it is feasible for a user (e.g., any user) to interactively communicate with connected endpoint resource for the established communications session based on the analysis data.

Additionally or alternatively, the path verification method 124 can include an identity verifier 130 programmed to determine whether the analysis data representing an identify of a user interacting with the connected endpoint resource for the established communications session matches the identity of a predetermined user, such as based on comparing analysis data and user data 126. For example, the user data 126 can include a predetermined voice signature for a given user. The user data 126 can, additionally or alternatively, include facial recognition profile data or other data derived from an image of the given user to help verify identity. The identity verifier thus can generate verification data 134 indicating whether or not it is feasible for a given user (e.g., a specific predetermined user) to be interactively communicating with connected endpoint resource for the established communications session based on the analysis data.

As disclosed herein, the path verification 124 or another method can take or trigger corrective action to be implemented in response to determining that one or more endpoint resources in a communications path represents an infeasible (e.g., invalid) solution under the circumstances for the established communications session based on the analyzer and verification methods 114 and 124.

Figure 4:
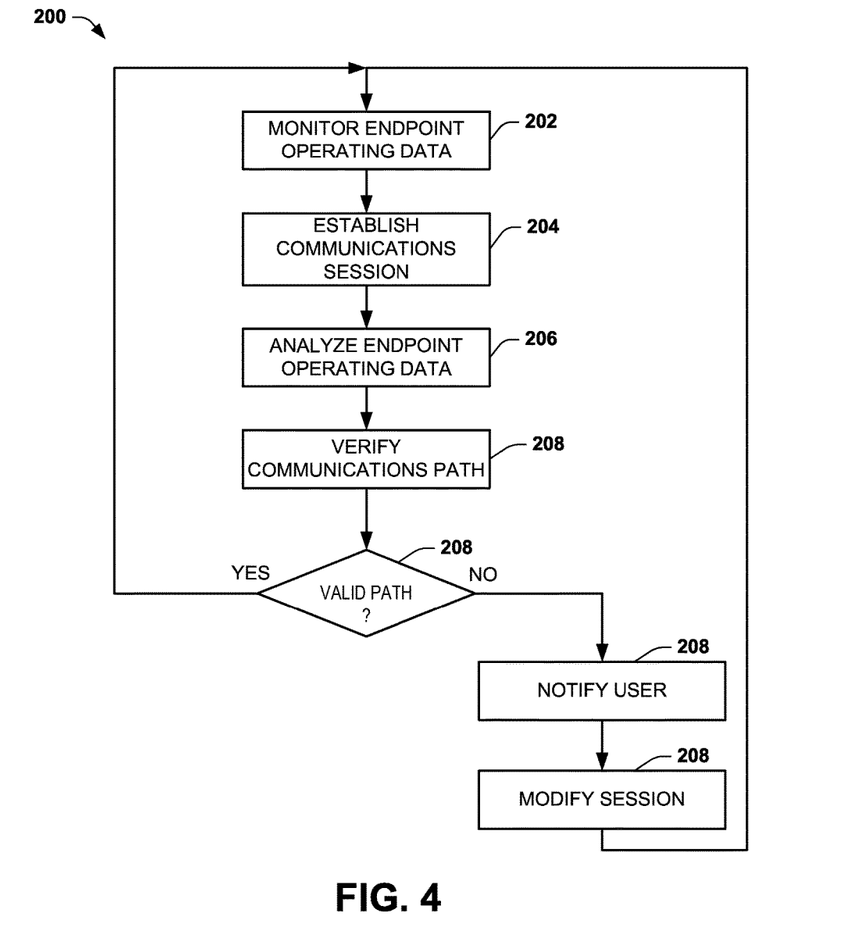
FIG. 4 depicts an example of a method for communications path verification.

In view of the structural and functional features described above, a method will be better appreciated with reference to FIG. 4. It is to be understood and appreciated that the illustrated actions, in other embodiments, may occur in different orders or concurrently with other actions. Moreover, not all actions illustrated in FIG. 4 may be required to implement a method. It is to be further understood that the following method can be implemented in hardware (e.g., in a computer or a processor based device or appliance), software (e.g., stored in a non-transitory computer readable medium or as executable instructions running on one or more processors), or as a combination of hardware and software.

The method 200 can be implemented to provide retroactive verification of an interactive communications path (e.g., for a telephone call or other type of call) established in a communications session. At 202, operating data for one or more communications is monitored (e.g., by EP monitor 86 of FIG. 2 or resource monitor 102 of FIG. 3). The operating data includes predetermined information indicating use by a person of a given endpoint resource. For example, the operating data can include direct information from the given endpoint resource (e.g., audio from a microphone, image from a camera, keystrokes from a key pad or touch screen user input device, location information from a GPS or the like) such as disclosed herein. The operating data can also include indirect information for the given endpoint resource that is not provided from the given endpoint resource. For example, the indirect information can include location data from a related mobile communications resource and/or user input from a nearby enterprise resource. The user inputs can include keystrokes, audio or image data captured from enterprise resources known to be co-located with the given endpoint resource that is connected in the established session. Additionally or alternatively, the indirect information can include information obtained from one or more services or applications operating in the enterprise, such as presence state information provided by a presence service or location data provided by a mobility application.

At 204, a communications session is established (e.g., by call routing/control 82 of resource manager 80) to provide a communications path between at least one endpoint resource associated with given user and another communications resource. The communications path can be established via one or more signaling protocols (e.g., SIP or the like). The session established at 204 can be for a new communication or a modified session, such as in response to changing session parameters during an ongoing session. Various approaches can be utilized for connecting an inbound or outbound call with an enterprise endpoint resource, such as location-based routing, least-cost routing, routing to a default endpoint resource for a given user, time-of-day and/or day or week routing to name a few. The analysis and verification of the established path can operate separately from the routing rules that are applied.

At 206, the endpoint operating data is analyzed such as disclosed herein (e.g., by analysis/verification 84 or analyzer 114). The analysis at 206 can analyze the data from 202 associated with operation of one or more endpoint resources related to the established communications path. As an example, the analysis can be performed with respect to data from resources associated with a given user and/or otherwise may provide information indicative of use or non-use (e.g., directly or indirectly) of the endpoint resource connected in the established communications path. The extent of the analysis can vary depending on application requirements and system capabilities, such as including any of the analyses disclosed herein, individually or in combination. For example, the analysis at 206 of the operating data can include operating data obtained prior to as well as after the communications path is established. Thus, the monitored operating data (at 202) can provide an indication of interactive use or non-use (by a user) of the connected endpoint resource just prior to as well as during the established communications session. For example, historical operating state and usage information from one or more of the endpoint resources can be evaluated to ascertain a temporal and likely spatial proximity between the given user and the particular resource that has been connected in the communications session.

At 208, a determination is made to verify the communications path for the established communications session based on the analysis at 206. The verification at 208 (as well as the entire method 200) can be performed, for example, to evaluate each enterprise endpoint resource connected in the communications path. The verification can ascertain whether the path is valid (e.g., the endpoint resource is a feasible endpoint) or invalid (e.g., the endpoint resource represents an infeasible endpoint) based on the analysis performed at 206 for a given endpoint resource. If the communications path is determined to be valid, such as disclosed herein, the communications session can continue unaffected, and may continue the monitoring at 202. If the parameters for the communications session are modified, such as by redirecting to another resource or otherwise (at 204), the analysis and verification at 204 and 206 can be re-executed to verify path for the modified session.

If the communications path is determined to be invalid (e.g., the connected endpoint resource represents an infeasible solution based on the analysis at 206), one or more forms of corrective measure can be implemented. In the example of FIG. 4, the method can proceed to 210. At 210, a user to or from whom the communications session was directed can be notified of the erroneous communications path that has been established. The notification can be sent to the user via one or more modes of communication (e.g., SMS, email, pre-recorded audio message, pop-up window or the like) to alert the user to the detected situation.

Additionally or alternatively, the method can proceed to 212 to modify the communications session in response to detecting the invalid (e.g., infeasible) communications path. The modified session can be via the signal protocol redirecting a call leg from to a different endpoint resource, such as corresponding to a user's current location (e.g., by resource manager 80 sending a corresponding SIP message). The current location can be determined based on the analysis at 206, for example. From 208, the method can return to 202 to repeat the method, including analysis and verification of the modified communications path that is established.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. One or more non-transitory computer readable medium having instructions, executable by one or more processors, to perform a method comprising:
    establishing a communications session to provide a communications path for at least one of an audio communication and a video communication between an endpoint resource and another communications resource, wherein the endpoint resource is one of a plurality of resources registered for operation in a private enterprise communications network for a given user and the communications path includes a call leg from the private enterprise communications network to the endpoint resource;
    in response to establishing the communications session, performing a retrospective verification of the communications path to detect a circumstance when the endpoint resource has been connected erroneously after the communications session has been established by analyzing resource operating data associated with the endpoint resource, wherein the resource operating data indicates at least one of activity or inactivity of the endpoint resource before the established communications session;
    in response to detecting that the endpoint resource has not been connected erroneously, continuing with the established communications session using the communications path between the endpoint resource and the other communications resource; and
    in response to detecting that the endpoint resource has been connected erroneously, the private enterprise communications network implementing a corrective action, wherein the corrective action comprises redirecting the call leg from the endpoint resource to another endpoint resource of the plurality of resources, which is registered in the private enterprise communications network for the given user and determined to be a current location for the given user, to enable the at least one audio communication and video communication to continue between the other endpoint resource and the other communications resource using the redirected call leg.

2. The medium of claim 1, wherein the retrospective verification further comprises determining the other endpoint resource based on resource operating data for the other endpoint resource, which is different from the endpoint resource in the established communications session, indicates activity of the other endpoint resource.

3. The medium of claim 1, wherein the resource operating data comprises location data indicating a location of the endpoint resource.

4. The medium of claim 3, wherein one of the plurality of resources registered in the private enterprise communications network for the given user comprises a mobile endpoint resource having a location that is stored as the location data, and wherein verifying further comprises determining a proximity of the mobile endpoint resource and the endpoint resource associated with the given user based on the location data.

5. The medium of claim 3, wherein the location data comprises at least one of a location of an IP address for the endpoint resource, a global positioning system location, near field communication data that provides an indication of where the endpoint resource is located.

6. The medium of claim 1, wherein the resource operating data comprises at least one of voice data, audio data and image data,
    wherein the method further comprises verifying an identity of the given user in the established communications session based on the at least one of voice audio data and the image data for the given user.

7. The medium of claim 1, wherein the method further comprises aggregating the resource operating data for a plurality of endpoint resources registered in the private enterprise communications network for the given user, and
    wherein analyzing the resource operating data further comprises analyzing the aggregated resource operating data.

8. The medium of claim 1, wherein the private enterprise communications network utilizes a signaling communications protocol to redirect the call leg from the endpoint resource to the other endpoint resource of the plurality of resources.

9. The medium of claim 8, wherein the signaling communications protocol comprises H.323 or session initiation protocol (SIP).

10. The medium of claim 8, wherein the private enterprise communications network includes a private branch exchange programmed to establish the communications session with the other communications resource, the private branch exchange further programmed to analyze the resource operating data and trigger the corrective action.

11. A system, comprising:
one or more memory devices configured to store resource operating data and instructions, the resource operating data for a plurality of endpoint resources operating in a private enterprise communications system; and
a processor configured to access the one or more memory devices and to execute the instructions to:
analyze resource operating data associated with at least one of a plurality of endpoint resources associated with a given user in response to establishing a communications session for at least one of an audio communication and a video communication over a communications path between an endpoint resource of the plurality of endpoint resources and another communications resource to provide analysis data indicating activity or inactivity of the endpoint resource of the plurality of endpoint resources before the established communications session, the communications path includes a call leg from the private enterprise communications network to the endpoint resource; and
perform a retrospective verification of the communications path by determining whether the given user is interacting with the one of the plurality of endpoint resources being utilized in the communications path for the established communications session is directed to the endpoint resource correctly based on the analysis data indicating activity or inactivity of the endpoint resource of the plurality of endpoint resources before the established communications session,
wherein in response to the processor verifying that the communications path is valid for the established communications session, continuing with the established communications session between the endpoint resource of the plurality of endpoint resources and the other communications resource, and
wherein in response to the processor verifying that the communications path is invalid for the established communications session, the private enterprise communications system implementing corrective action that includes redirecting a call leg from the endpoint resource of the plurality of endpoint resources to another endpoint resource of the plurality of endpoint resources, which is registered in the private enterprise communications network for the given user and determined to be a current location for the given user, to enable the at least one audio communication and video communication to continue between the other endpoint resource and the other communications resource using the redirected call leg.

12. The system of claim 11, wherein the processor further executes the instructions to collect operating information from the plurality of endpoint resources associated with the given user to provide the resource operating data to indicate at least one of location information, activity information and session information for each respective endpoint resource in a set of the plurality of endpoint resources associated with the given user.

13. The system of claim 12, wherein the processor further executes the instructions to analyze at least the activity information for each respective endpoint resource in the set of the plurality of endpoint resources to provide corresponding analysis data for each respective endpoint resource in the set of the plurality of endpoint resources.

14. The system of claim 12, wherein the processor further executes the instructions to analyze at least one of the activity and session information for each respective endpoint resource in the set of the plurality of endpoint resources to provide corresponding analysis data for each respective endpoint in the set of the plurality of endpoint resources, the analysis data for each respective endpoint in the set of the plurality of endpoint resources being aggregated to provide an aggregate indication of activity associated with the given user that is used determine whether the communications path for the established communications session is valid or invalid.

15. The system of claim 12, wherein the processor further executes the instructions to analyze at least the location information for each respective endpoint resource in the set of the plurality of endpoint resources to provide corresponding analysis data for each respective endpoint in the set of the plurality of endpoint resources.

16. The system of claim 11, wherein the private enterprise communications network utilizes a signaling communications protocol to redirect the call leg from the endpoint resource to the other endpoint resource of the plurality of resources.

17. The system of claim 16, wherein the signaling communications protocol comprises H.323 or session initiation protocol (SIP).

18. The system of claim 16, wherein the private enterprise communications network includes a private branch exchange programmed to establish the communications session with the other communications resource, the private branch exchange further programmed to analyze the resource operating data and trigger the corrective action.

19. A method comprising:
storing, in memory, resource operating data associated with a plurality of endpoint resources operating in a private enterprise communications network for a given user;
analyzing the resource operating data associated with one of the plurality of endpoint resources in response to establishing a communications session for at least one of an audio communication and a video communication over a communications path between the one of the plurality of endpoint resources and another communications resource to ascertain an indication of at least one of user activity or inactivity of the endpoint resource before the established communications session, wherein the communications path includes a call leg from the private enterprise communications network to the endpoint resource; and
performing a retrospective verification of the communications path by determining whether the given user is interacting with the one of the plurality of endpoint resources being utilized in the communications path of the established communications session based on the indication of at least one of user activity or inactivity of the endpoint resource before the established communications session;
wherein in response to determining that the communications path is valid for the established communications session based on the indication of at least one of user activity or inactivity, continuing with the established communications session over the communications path between correct one of the plurality of resources and the other communications resource, and wherein in response to determining that the communications path is invalid for the established communications session based on the indication of at least one of user activity or inactivity, implementing corrective action, wherein the corrective action comprises redirecting a call leg from the endpoint resource to another endpoint resource of the plurality of resources, which is registered in the private enterprise communications network for the given user and determined to be a current location for the given user, to enable the at least one audio communication and video communication to continue between the other endpoint resource and the other communications resource using the redirected call leg.

20. The method of claim 19, wherein analyzing further comprises at least one of:

analyzing location data for at least one of the endpoint resources identified as a mobile endpoint resource to determine a proximity between the mobile endpoint resource and the endpoint resource in the communications path;

analyzing activity data for each endpoint resource associated with the given user to indicate one of use or non-use for each respective endpoint resource associated with the given user; and analyzing presence information derived from at least one of the activity data and session data for each endpoint resource associated with the given user.

21. The method of claim 19, wherein the private enterprise communications network utilizes a signaling communications protocol to redirect the call leg from the endpoint resource to the other endpoint resource of the plurality of resources.

22. The method of claim 21, wherein the signaling communications protocol comprises H.323 or session initiation protocol (SIP).

23. The method of claim 21, wherein the private enterprise communications network includes a private branch exchange programmed to establish the communications session with the other communications resource, the private branch exchange further programmed to analyze the resource operating data and trigger the corrective action.

* * * * *